United States Patent
Zhong et al.

(10) Patent No.: US 11,643,283 B2
(45) Date of Patent: May 9, 2023

(54) VEHICLE MEASUREMENT SYSTEM FOR AUTOMATIC CONVEYOR

(71) Applicant: Hubei University, Wuhan (CN)

(72) Inventors: Zhifeng Zhong, Wuhan (CN); Shihui Wang, Wuhan (CN); Yan Zhang, Wuhan (CN); Jingjing Zhao, Wuhan (CN); Pu Tan, Wuhan (CN); Zhang Jiang, Wuhan (CN); Min Zhou, Wuhan (CN)

(73) Assignee: Hubei University, Hubei (CN)

( * ) Notice: Subject to any disclaimer, the term of this patent is extended or adjusted under 35 U.S.C. 154(b) by 271 days.

(21) Appl. No.: 16/913,389

(22) Filed: Jun. 26, 2020

(65) Prior Publication Data

US 2020/0407174 A1 Dec. 31, 2020

(30) Foreign Application Priority Data

Jun. 28, 2019 (CN) .......................... 201910572109.5

(51) Int. Cl.
*B65G 47/52* (2006.01)
*B23Q 7/14* (2006.01)
(Continued)

(52) U.S. Cl.
CPC ............ *B65G 47/52* (2013.01); *B23Q 7/1447* (2013.01); *G01B 11/14* (2013.01); *G01B 11/26* (2013.01);
(Continued)

(58) Field of Classification Search
CPC ...... B23Q 7/1447; B65G 47/52; G01B 11/14; G01B 11/26; G01B 11/02; G01B 11/026;
(Continued)

(56) References Cited

U.S. PATENT DOCUMENTS

| | | | | |
|---|---|---|---|---|
| 5,314,037 A | * | 5/1994 | Shaw ........................ | B60T 7/22 188/DIG. 1 |
| 2014/0333472 A1 | * | 11/2014 | Nagy ....................... | G08G 1/01 342/146 |
| 2018/0165834 A1 | * | 6/2018 | Sekiguchi ............... | G01S 17/08 |

FOREIGN PATENT DOCUMENTS

| | | | |
|---|---|---|---|
| CN | 101138867 A | * | 3/2008 |
| WO | WO-2017108201 A1 | * | 6/2017 |

* cited by examiner

*Primary Examiner* — Sunghee Y Gray
(74) *Attorney, Agent, or Firm* — Jason T. Daniel, Esq.; Daniel Law Offices, P.A.

(57) ABSTRACT

Provided is a vehicle measurement system for an automatic conveyor. The measurement system includes: an information measurement unit, disposed at a position higher than the ready-for-loading vehicle and including two laser radars: a rear radar and a side radar; a voice prompt unit, configured to send a voice prompt; and a control unit; where when the ready-for-loading vehicle is approaching, the rear radar measures a distance between it and the ready-for-loading vehicle in real time as a predetermined parking distance; when a value of the predetermined parking distance is within a predetermined range, the control unit controls the voice prompt unit to send a voice prompt for parking; and after the ready-for-loading vehicle stops, the information measurement unit measures the distance between the ready-for-loading vehicle and the rear radar, carriage size information, and a deviation angle of a parking position of the ready-for-loading vehicle from the predetermined parking area.

5 Claims, 4 Drawing Sheets

(51) Int. Cl.
  *G01S 17/06* (2006.01)
  *G01B 11/14* (2006.01)
  *G01B 11/26* (2006.01)
  *G01S 17/88* (2006.01)
  *G01S 17/931* (2020.01)

(52) U.S. Cl.
  CPC .............. *G01S 17/06* (2013.01); *G01S 17/88* (2013.01); *G01S 17/931* (2020.01)

(58) Field of Classification Search
  CPC ..... G01B 11/0608; G01S 17/06; G01S 17/08; G01S 17/86; G01S 17/88; G01S 17/931; G08B 21/24
  USPC .......................................................... 342/70
  See application file for complete search history.

VEHICLE MEASUREMENT SYSTEM FOR AUTOMATIC CONVEYOR

TECHNICAL FIELD

The present invention relates to the field of industrial measurement control, and in particular, to a vehicle measurement system for an automatic conveyor.

BACKGROUND

In China, the existing automatic loading systems do not have a mature automatic loading technology. Especially for the cement industry, the heavy dust on the site brings difficulties to a vehicle measurement system. Currently, image recognition methods are commonly used for accurate measurement. However, experiments show that although the image recognition method can achieve a high accuracy and meet the measurement requirements, it takes a long time to execute the method and process data. This means a lower productivity and an increased investment. The existing loading systems used in cement plants do not have a mature automatic vehicle measurement technology, and vehicles need to be located manually. However, parameters such as deviation angles of vehicles and parking distances cannot be accurately determined through manual operations. Improper manual operations will lead to packing failure.

SUMMARY

To solve the above problems, the present invention provides a vehicle measurement system for an automatic conveyor that can automatically determine the parking of a ready-for-loading vehicle and can automatically and accurately measure carriage size information and a parking position of the ready-for-loading vehicle.

The present invention provides a vehicle measurement system for an automatic conveyor, where the system is configured to measure parking position information of a ready-for-loading vehicle, the ready-for-loading vehicle has a carriage consisting of a front fender, a rear fender, a front side fender, a rear side fender, and a floor, and the system includes: an information measurement unit, disposed at a position higher than the ready-for-loading vehicle and including two laser radars: a rear radar and a side radar; a voice prompt unit, configured to send a voice prompt; and a control unit, configured to control the information measurement unit and the voice prompt unit; where when the ready-for-loading vehicle is approaching, the rear radar measures a distance between it and the ready-for-loading vehicle in real time as a predetermined parking distance; when a value of the predetermined parking distance is within a predetermined range, the control unit controls the voice prompt unit to send a voice prompt for parking; and after the ready-for-loading vehicle stops, the information measurement unit measures the distance between the ready-for-loading vehicle and the rear radar, carriage size information, and a deviation angle of a parking position of the ready-for-loading vehicle from the predetermined parking area.

The vehicle measurement system for an automatic conveyor of the present invention further has the following characteristics: the predetermined parking distance is a distance between the front fender and the rear radar, and a specific measurement process is as follows: assuming that a set X={x1, x2 . . . x274} represents horizontal distance values acquired by the rear radar during one frame of data, data is taken in a reverse direction; specifically, five points are taken in each loop; when errors between the x values of five adjacent points are within ±20 mm, it is determined that the front fender is found, and an average x value of these five points is used as the distance between the front fender and the rear radar, that is, the predetermined parking distance.

The vehicle measurement system for an automatic conveyor of the present invention further has the following characteristics: a carriage size further includes a carriage length, and a measurement process is as follows: first, measuring a horizontal distance D between the front fender and the rear radar, where assuming that a set X={x1, x2 . . . x274} represents horizontal distance values acquired by the rear radar during one frame of data, data is taken in a reverse direction; specifically, five points are taken in each loop; when errors between the x values of five adjacent points are within ±20 mm, it is determined that the front fender is found, and an average value of these five points is used as the horizontal distance D between the front fender and the rear radar; then, measuring a horizontal distance L between the rear fender and the rear radar, where assuming that a set xa={x1, x2 . . . x274} represents horizontal distance values acquired by the rear radar during one frame of data, data is taken in a forward direction; specifically, five points are taken in each loop; when errors between the x values of five adjacent points are within ±20 mm, it is determined that the rear fender is found, and an average value of these five points is used as the horizontal distance L between the rear fender and the rear radar; lastly, obtaining the carriage length based on the horizontal distance D and the horizontal distance L.

The vehicle measurement system for an automatic conveyor of the present invention further has the following characteristics: a carriage size further includes a height of the rear fender, and a measurement process is as follows: the rear radar scans the ground, a bottom of the rear fender, the rear fender, a top of the rear fender, part of the floor, the front fender, and a top of the front fender in order, and it is assumed that a set Y={y1, y2 . . . y274} represents vertical distance values acquired by the rear radar during one frame of data; first, determining a vertex of the rear fender, where data is taken in a forward direction; starting from y1, the first point at which the y value decreases by more than 100 mm is found, and then a point previous to the found point is determined as the vertex of the rear fender, and the y value at this time is a top height of the rear fender; then, determining the floor, where starting from the vertex of the rear fender, five points are taken in each loop; when errors between the y values of five adjacent points are within ±20 mm, an average y value of these five points is used as a height of the floor; lastly, obtaining the height of the rear fender based on the top height of the rear fender and the height of the floor.

The vehicle measurement system for an automatic conveyor of the present invention further has the following characteristics: a process of measuring a deviation angle between the parking position of the ready-for-loading vehicle and the predetermined parking area is as follows: assuming that a point O is a laser source, $O_1$ is a point that the laser source irradiates on the rear side fender when the ready-for-loading vehicle stops in the predetermined area, a line segment OP1 indicates points irradiated on the rear side fender from a P1 laser plane, and a line segment OP2 indicates points irradiated on the rear side fender from a P4 laser plane, the P1 plane is vertical to the ground, α is a known angle between the P4 plane and the P1 plane, and c is a deviation angle, then $$Lc = \arctan\frac{O_1P_1}{O_1P_2},$$

where $O_1P_1=OO_1-OP_1$, $OO_1=OP_2*\cos\alpha$, and $O_1P_2=OP_2\sin\alpha$.

The vehicle measurement system for an automatic conveyor of the present invention further has the following characteristics: the laser radar performs active photoelectric laser measurement based on the Time-of-Flight principle, and parameters of the laser radar are as follows: a longest measurement distance is 65 meters, a maximum quantity of measurement points on a plane is 274, a measurement angle is 96 degrees, and an angular resolution is 0.3516.

Function and Effect of the Present Invention

According to a vehicle measurement system for an automatic conveyor of the present invention, two laser radars are provided at the rear and on the lateral side of a vehicle at a height higher than an overall height of the vehicle. In this way, when the vehicle enters a parking area, the rear radar can collect a distance between the vehicle and the rear radar in real time. The system can determine, based on the distance, when the vehicle needs to stop. A voice prompt unit sends a parking reminder when parking is needed, so that a driver obtains a parking command accurately. This ensures that the ready-for-loading vehicle can be parked in the parking area accurately. In addition, after the vehicle stops, the system further measures a deviation angle between an actual parking position of the vehicle and the predetermined parking area and carriage information, and adjusts a mechanical arm of an automatic conveyor based on the measurement data. This ensures more accurate loading by the automatic conveyor, and greatly improves the loading efficiency through automation.

DETAILED DESCRIPTION

The present invention is further described below by using examples, but the present invention is not limited to the scope of the described examples.

Examples

Figure 1:
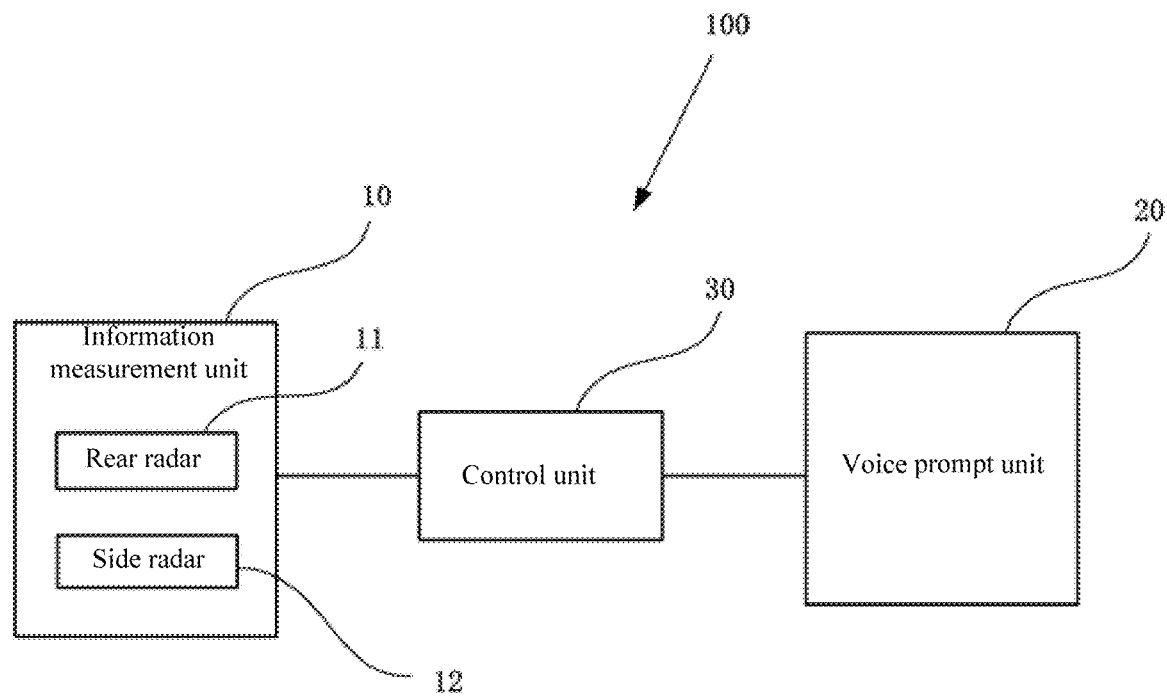
FIG. 1 is a schematic structural diagram of a vehicle measurement system for an automatic conveyor according to an example of the present invention.

FIG. 1 is a schematic structural diagram of a vehicle measurement system for an automatic conveyor according to an example of the present invention.

Figure 5:
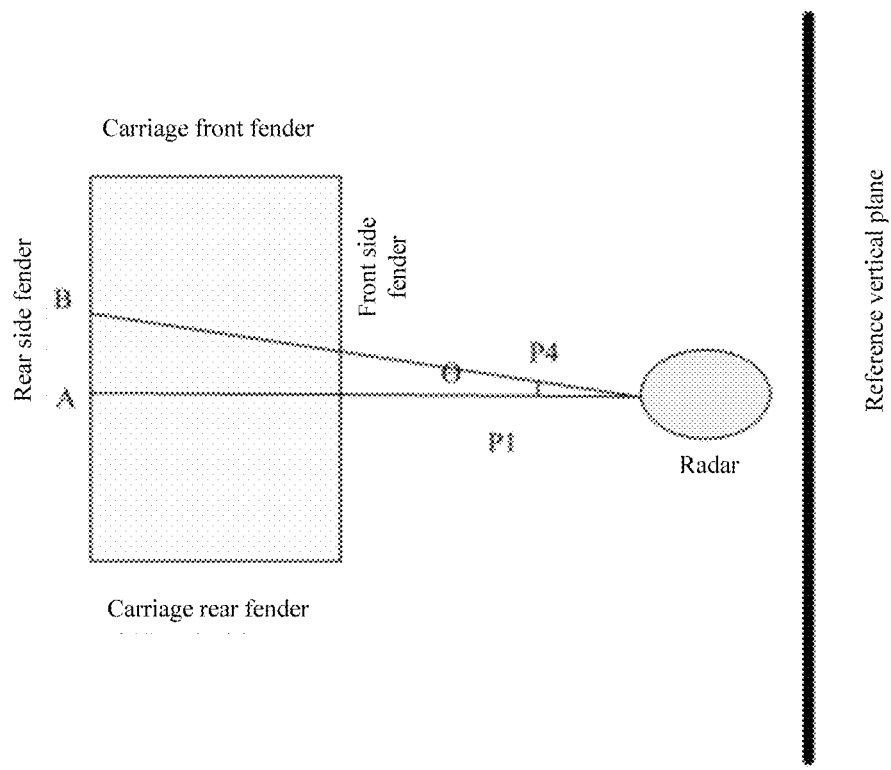
FIG. 5 is a schematic diagram of a laser radar in ideal installation mode according to an example of the present invention.

As shown in FIG. 1, in this example, a vehicle measurement system for an automatic conveyor 100 is applied to a loading system in the cement industry. Considering the actual environmental factors and loading efficiency, the vehicle measurement system for an automatic conveyor 100 uses a laser radar for multi-side scanning and measurement to realize parking alarming of a ready-for-loading vehicle, measure location information of the ready-for-loading vehicle, and measure a parking deviation of the vehicle. As shown in FIG. 5, in this example, any ready-for-loading vehicle has a carriage composed of a front fender, a rear fender, a front side fender, a rear side fender, and a floor.

The vehicle measurement system for an automatic conveyor 100 includes an information measurement unit 10, a voice prompt unit 20, and a control unit 30.

The information measurement unit 10 is located near a predetermined parking area and is higher than an overall height of a ready-for-loading vehicle. In practical, the unit is installed at a position about 5 meters from the ground. The information measurement unit 10 includes two laser radars: a rear radar 11 located behind a parking position of the ready-for-loading vehicle and a side radar 12 located on a lateral side of the parking position of the ready-for-loading vehicle.

The voice prompt unit 20 is configured to send a voice prompt so that a driver of the vehicle can clearly hear the command.

The control unit 30 includes a computer program for controlling the operation of the information measurement unit 10 and the voice prompt unit 20. Specifically, when the ready-for-loading vehicle enters the predetermined parking area, the rear radar 11 measures the distance between it and the ready-for-loading vehicle as a predetermined parking distance in real time. When the predetermined parking distance is within a predetermined range, the control unit 30 controls the voice prompt unit 20 to send a voice prompt for parking, so that the driver can clearly obtain a parking instruction and execute it. The predetermined parking distance herein is a distance between the front fender and the rear radar. A specific measurement process is as follows:

Assuming that a set X={x1, x2 . . . x274} represents horizontal distance values acquired by the rear radar during the measurement of one frame of data, data is taken in a reverse direction, and five points are cyclically taken. When errors between the x values of five adjacent points are within ±20 mm, it is determined that the front fender is found, and an average x value of these five points is used as the distance between the front fender and the rear radar, that is, the predetermined parking distance.

After the ready-for-loading vehicle stops, the control unit 30 controls the information measurement unit 10 to measure the distance between the vehicle and the rear radar, carriage size information, and a deviation angle of a parking position of the vehicle from the predetermined parking area. In this example, the distance between the ready-for-loading vehicle and the rear radar is the distance between the front fender of the vehicle carriage and the rear radar, and the carriage size information includes a length of the vehicle carriage and a height of the rear fender.

The following describes the measurement processes of the rear radar 11 and the side radar 12 in detail.

In this example, the TL900 laser scanning radar is used, which is an active photoelectric laser measurement system based on the Time-of-Flight (ToF) principle. If a laser beam irradiates an object, it will be reflected to a sensor head. Based on a time delay between the time when a light pulse is emitted and the time when a portion reflects the same light pulse, a distance between the rear radar and the object can be determined.

Important parameters of the laser radar: A longest measurement distance is 65 meters, a maximum quantity of measurement points on a plane is 274, a measurement angle is 96 degrees, an angular resolution is 0.3516, an output interface is RS-485, a baud rate is 460800, and a code includes one start bit and one stop bit, but no parity bit, with the high and low bytes reversed.

Power supply part of the vehicle measurement system for an automatic conveyor: A 24V DC voltage source is used as a power source for the laser radar and an RS485 to Ethernet converter.

Because the laser radar has a certain deviation angle during installation, it needs to be debugged and corrected by software. A top view is shown in FIG. 1.

In ideal installation mode, there is no deviation angle $\theta$, that is, the horizontal distance between the laser radar and the front fender of the carriage is obtained based on points on the front fender that the laser radar directly irradiates. However, during the installation, an error caused by manual installation needs to be corrected for accurate measurement. That is, the horizontal distance x is calculated as follows:

$$x = L * \cos \theta$$

During site installation, installation personnel adjust an irradiation angle, so that the radar can irradiate as many points as possible on a target, to improve the accuracy of the measurement.

To facilitate the installation and commissioning of the vehicle measurement system, it is necessary to display the obtained data in real time, that is, parse out data based on the lidar communication protocol, and then decompose it into a horizontal distance and a vertical distance based on trigonometric functions.

Figure 2:
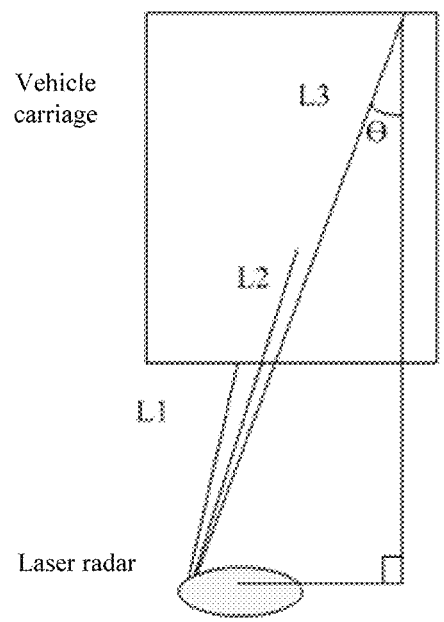
FIG. 2 is a schematic diagram for measuring a horizontal distance by a laser radar according to an example of the present invention.

Coordinate Decomposition:

Calibrate the parsed data with the horizontal ground, determine the zero point, and then perform trigonometric function decomposition, to obtain a horizontal distance and a vertical distance between a point irradiated by the laser radar and the laser radar. FIG. 2 shows the decomposition principle.

Relative to a position of the radar, take five points at the near end and the far end respectively to calculate an average value in the vertical direction, and calculate a difference. If an error is less than 30, a horizontal line n is found. A mathematical expression is as follows:

It is assumed that a set A {a1, a2, a3 . . . } has a total of 274 values. Because a laser scanning angle is 96 degrees, an angular resolution is Angular_resolution=96/273=0.3516.

Since laser beams irradiate on the horizontal plane,
  five points A1={a1, a2, a3, a4, a5} are taken at the near end,
  and five points A2={a270, a271, a272, a273, a274} are taken at the far end.

The near end is used as an example to illustrate how to find a horizontal line:

Decompose the value A1 obtained from the five points at the near end to a vertical position of the horizontal line. From the above figure, to obtain the vertical distance, it is necessary to know a point (denoted by n) in the set A to which a point irradiated by the radar and a point vertical to the ground correspond. Therefore, manually set an approximate value of n, adjust the value of n, and then check whether the vertical distance obtained based on the five points at the near end and the far end is within an error range of 30 mm. If yes, determine that the value of n is correct, which means that the horizontal line is found. That is, the average vertical distance is:

$$\bar{y} = \frac{\sum_{i=1}^{5} a_i \cos(i-n) * \text{Angular\_resolution} * \pi / 180}{5}$$

It is known from the above that n is a point vertical to the ground, and Angular_resolution is the angular resolution. After the average vertical distance is obtained, use a vertical component of each point to determine whether an error is within 30 mm. If so, the horizontal line is found.

It is assumed that a ray n is the horizontal line to be found, then for point A, horizontal direction: $x = \overline{OA} \cos(i-n) * \text{Angular\_resolution} * \pi/180$ vertical direction: $y = \overline{OA} \sin(i-n) * \text{Angular\_resolution} * \pi/180$ FIG. 3 shows the points on the carriage irradiated by the radar.

Figure 3:
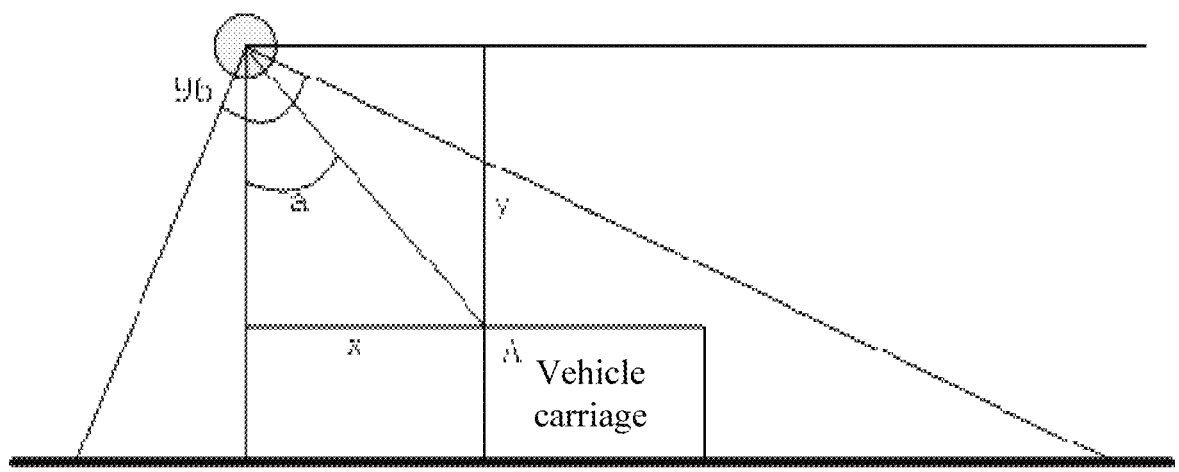
FIG. 3 is an exploded view of beams of a laser radar according to an example of the present invention.
Figure 4:
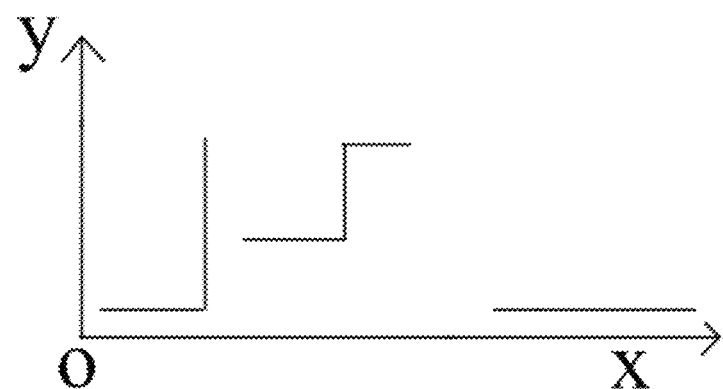
FIG. 4 is a schematic diagram illustrating that beams of a laser radar irradiate on a vehicle carriage according to an example of the present invention.

Description of FIG. 3: The straight line below is the points irradiated on the ground. The first vertical line is the rear fender of the carriage. Due to the installation position of the laser radar, the laser radar cannot irradiate all the floor of the carriage, so some part cannot be displayed. The upper horizontal line indicates the bottom of the carriage, a vertical line indicates the front fender of the carriage, the subsequent horizontal line is the part of the front end irradiated, and the last line is the points irradiated on the ground.

After the vehicle stops, a process of measuring the distance between the front fender of the vehicle and the rear radar is as follows:

The distance herein is the horizontal distance between the front fender and the radar after the vehicle stops. Assuming that a set X={x1, x2 . . . x274} represents horizontal distance values acquired by the rear radar during one frame of data, data is taken in a reverse direction. Specifically, five points are taken in each loop. When errors between the x values of five adjacent points are within ±20 mm, it is determined that the front fender is found, and an average value of these five points is used as the distance between the front fender and the rear radar. If an index value of the set is n, then the average distance x is expressed as:

$$\bar{x} = \frac{\sum_{n}^{n-4} x_i}{5}$$

In practice, a distance that an automatic cement conveyor needs to advance is Distance3, and a horizontal distance D between the rear radar and the origin of the automatic cement conveyor can be measured. Then, if the following mathematical expression is satisfied, the distance that the automatic cement conveyor needs to advance can be obtained:

$$\text{Distance3} = \bar{x} + D$$

A process of measuring the length of the carriage is as follows:

First, measure the horizontal distance D between the front fender and the rear radar. Assuming that a set X={x1, x2 . . . x274} represents horizontal distance values acquired by the rear radar during one frame of data, data is taken in a reverse direction. Specifically, five points are taken in each loop. When errors between the x values of five adjacent points are within ±20 mm, it is determined that the front fender is found, and an average value of these five points is used as the horizontal distance D between the front fender and the rear radar. If an index value of the set is n, then the average distance x is expressed as:

$$\bar{x} = \frac{\sum_{n}^{n-4} x_i}{5}$$

The average distance x is the horizontal distance D between the front fender and the radar.

Then, measure a horizontal distance L between the rear fender and the rear radar. Assuming that a set xa={x1, x2 . . . x274} represents horizontal distance values acquired by the rear radar during one frame of data, data is taken in a forward direction. Specifically, five points are taken in each loop. When errors between the x values of five adjacent points are within ±20 mm, it is determined that the rear fender is found, and an average value of these five points is used as the horizontal distance L between the rear fender and the rear radar. If an index value of the set is k, then the average distance xa is expressed as:

$$\overline{xa} = \frac{\sum_{i=n}^{n+4} x_i}{5}$$

The average distance xa is the horizontal distance L between the rear fender and the radar.

Lastly, obtain the length of the carriage based on the horizontal distance D and the horizontal distance L. That is, the carriage length Car_length is:

Car_length=D−L

A process of measuring the length of the rear fender of the carriage is as follows:

The key step is to find the floor. The scanning order of the rear radar is: ground>bottom of the rear fender>rear fender>top of the rear fender>floor (due to the irradiation angle, only part of the floor can be seen)>front fender>top of the front fender. It is assumed that a set Y={y1, y2 . . . y274} represents vertical distance values acquired by the rear radar during one frame of data.

First, determine a vertex of the rear fender. Specifically, data is taken in a forward direction. Starting from an initial value, find the first point where the y value decreases by more than 100 mm. Then, a point previous to the found point is the vertex of the rear fender, and the y value at this time is a top height Distance6 of the rear fender.

Then, determine the floor. Starting from the vertex of the rear fender, take five points in each loop. When errors between the y values of five adjacent points are within ±20 mm, take the average y value of these five points as a height D of the floor.

Lastly, subtract the height D of the floor from the height Distance6 of the rear fender to obtain a height Distance5 of the rear fender of the carriage.

Assuming that in the set Y, points with the index n meet the requirements for finding the rear fender, and points with the index k meet the requirements for finding the floor, the mathematical formula is as follows:

$$Distance6 = y_n$$

$$D = \sum_{i=k}^{k+4} y_i$$

$$Distance5 = Distance6 - D$$

A process of measuring a deviation angle between the parking position of the ready-for-loading vehicle and the predetermined parking area is as follows:

In ideal installation mode, after the side radar is installed, an angle θ is 6 degrees, and two points A and B irradiated on the rear fender from two planes P1 and P4 relative to a reference vertical plane can be obtained. Because there is an installation deviation angle in actual cases, that is, the side radar does not necessarily faces a specified area directly, correction has been made during the calculation. FIG. 5 shows the principle.

Figure 6:
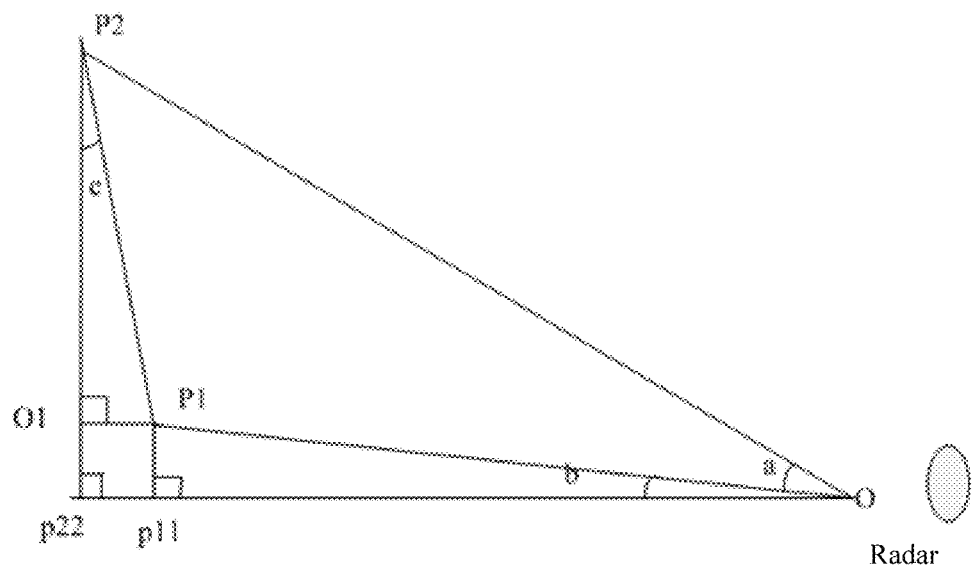
FIG. 6 is a schematic diagram of a laser radar in actual installation mode according to an example of the present invention.
Figure 7:
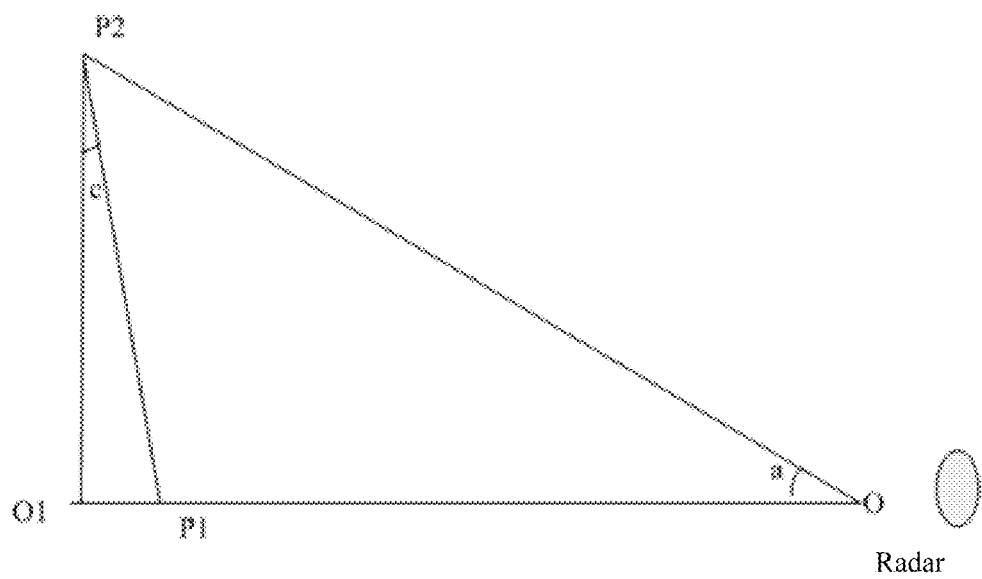
FIG. 7 is a schematic diagram of the laser radar in FIG. 6 after an installation deviation angle is corrected.

OP1 indicates points radiated on a rear side fender from a P1 laser plane, OP2 indicates points radiated on the rear side fender from a P4 laser plane, and a deviation angle is c. A value of an angle b is required to solve this triangle. The angle b can be corrected through zeroing. FIG. 6 shows a mathematical model after the angle b is corrected.

A point O is a laser source, $O_1$ is a point that the laser source irradiates on the rear side fender when a ready-for-loading vehicle stops in a predetermined area, the line segment OP1 indicates points irradiated on the rear side fender from the P1 laser plane, and the line segment OP2 indicates points irradiated on the rear side fender from the P4 laser plane, the P1 plane is vertical to the ground, α is a known angle between the P4 plane and the P1 plane (specifically 6 degrees), and c is a deviation angle.

Then $$Lc = \arctan\frac{O_1P_1}{O_1P_2},$$

where $O_1P_1 = OO_1 - OP_1$, $OO_1 = OP_2 * \cos\alpha$, and $O_1P_2 = OP_2 \sin\alpha$.

The deviation angle c can be calculated according to the above mathematical relationship.

In summary, the measurement results of the vehicle measurement system for an automatic conveyor applied to a cement plant meet the requirements for automatic loading.

Function and Effect of Examples

According to a vehicle measurement system for an automatic conveyor of the examples, two laser radars are provided at the rear and on the lateral side of a vehicle at a height higher than an overall height of the vehicle. In this way, when the vehicle enters a parking area, the rear radar can collect a distance between the vehicle and the rear radar in real time. The system can determine, based on the distance, when the vehicle needs to stop. A voice prompt unit sends a parking reminder when parking is needed, so that a driver obtains the parking command accurately. This ensures that the vehicle can be parked in the parking area accurately. In addition, after the vehicle stops, the system further measures a deviation angle between an actual parking position of the vehicle and the predetermined parking area and carriage information, and adjusts a mechanical arm of an automatic conveyor based on the measurement data. This ensures more accurate loading by the automatic conveyor.

When the vehicle measurement system for an automatic conveyor of the examples is applied to a loading system of the cement industry, automatic processing can be implemented after an operator manually clicks the start button when a vehicle arrives. Through multi-side scanning and measurement of a laser radar, vehicle parking alarming is implemented, and a parking distance is measured. In addition, the measurement of a deviation angle can reduce the time consumed when the driver fails to park the vehicle correctly to the predetermined parking area. The loading efficiency is greatly improved through automation.

In addition, the Winform program, wincc, and PLC control software are used. Measurement data is processed through the winform program and wincc programming. The highly extensible lines of the software are convenient for subsequent upgrade, installation of the automatic loading measurement systems for cement plants in different environments, and informationization of the cement plants, such as automatic invoicing and online orders. The technical solutions of the present invention can also be applied to other industries, such as sugar industry, salt industry, or some other scenarios that require the measurement of vehicle carriage data.

Although the specific examples of the present invention have been described above, those skilled in the art should understand that these are only examples, and the protection scope of the present invention is defined by the appended claims. Those skilled in the art can make various changes or modifications to these examples without departing from the principle and essence of the present invention, but all these changes and modifications shall fall within the protection scope of the present invention.

What is claimed is:

1. A vehicle measurement system for an automatic conveyor, wherein the system is configured to measure parking position information of a ready-for-loading vehicle, the ready-for-loading vehicle has a carriage consisting of a front fender, a rear fender, a front side fender, a rear side fender, and a floor, and the system comprises:
   two radars including a rear radar and a side radar, wherein the two radars are disposed at positions higher than the ready-for-loading vehicle, and the two radars are configured to perform active photoelectric laser measurement based on a Time-of-Flight principle and parameters of the two radars are as follows: a longest measurement distance is 65 meters, a maximum quantity of measurement points on a plane is 274, a measurement angle is 96 degrees, and an angular resolution is 0.3516;
   a voice prompt device, configured to send a voice prompt; and
   a control device, configured to control the two radars and the voice prompt device, wherein
   when the ready-for-loading vehicle is approaching, the control device acquires a distance between the rear radar itself and the ready-for-loading vehicle in real time by measurement of the rear radar as a predetermined parking distance;
   when the control device determines that a value of the predetermined parking distance is within a predetermined range, the control device controls the voice prompt device to send a voice prompt for parking; and
   after the ready-for-loading vehicle stops, the rear radar measures the distance between the ready-for-loading vehicle and the rear radar, and carriage size information, and the side radar measures a deviation angle of a parking position of the ready-for-loading vehicle from a predetermined parking area.

2. The vehicle measurement system for an automatic conveyor according to claim 1, wherein:
   the predetermined parking distance is a distance between the front fender and the rear radar, and a specific measurement process is as follows:
   assuming that a set X={x1, x2 . . . x274} represents horizontal distance values acquired by the rear radar during one frame of data, data is taken in a reverse direction; specifically, five points are taken in each loop; when errors between the x values of five adjacent points are within ±20 mm, it is determined that the front fender is found, and an average x value of these five points is used as the distance between the front fender and the rear radar, that is, the predetermined parking distance.

3. The vehicle measurement system for an automatic conveyor according to claim 1, wherein:
   a carriage size further comprises a carriage length, and a measurement process is as follows:
   first, measuring a horizontal distance D between the front fender and the rear radar, wherein assuming that a set X={x1, x2 . . . x274} represents horizontal distance values acquired by the rear radar during one frame of data, data is taken in a reverse direction; specifically, five points are taken in each loop; when errors between the x values of five adjacent points are within ±20 mm, it is determined that the front fender is found, and an average value of these five points is used as the horizontal distance D between the front fender and the rear radar;
   then, measuring a horizontal distance L between the rear fender and the rear radar, wherein assuming that a set xa={x1, x2 . . . x274} represents horizontal distance values acquired by the rear radar during one frame of data, data is taken in a forward direction; specifically, five points are taken in each loop; when errors between the x values of five adjacent points are within ±20 mm, it is determined that the rear fender is found, and an average value of these five points is used as the horizontal distance L between the rear fender and the rear radar;
   lastly, obtaining the carriage length based on the horizontal distance D and the horizontal distance L.

4. The vehicle measurement system for the automatic conveyor according to claim 1, wherein:
   a carriage size further comprises a height of the rear fender;
   the rear radar scans a ground, a bottom of the rear fender, the rear fender, a top of the rear fender, part of the floor, the front fender, and a top of the front fender in order;
   the control device acquires vertical distance values as a set Y={y1, y2 . . . y274} by the rear radar scanning during one frame of data;
   the control device determines a vertex of the rear fender based on the acquired data, wherein data is taken in a forward direction; starting from y1, the first point at which the y value decreases by more than 100 mm is found, and then a point previous to the found point is determined as the vertex of the rear fender, and the y value at this time is a top height of the rear fender;

the control device determines the floor, wherein starting from the vertex of the rear fender, five points are taken in each loop; when errors between the y values of five adjacent points are within ±20 mm, an average y value of the five points is used as a height of the floor; and the control device obtains the height of the rear fender based on the top height of the rear fender and the height of the floor.

5. The vehicle measurement system for an automatic conveyor according to claim 1, wherein:

a process of measuring a deviation angle between the parking position of the ready-for-loading vehicle and the predetermined parking area is as follows:

assuming that a point O is a laser source, $O_1$ is a point that the laser source irradiates on the rear side fender when the ready-for-loading vehicle stops in the predetermined area, a line segment OP1 indicates points irradiated on the rear side fender from a P1 laser plane, and a line segment OP2 indicates points irradiated on the rear side fender from a P4 laser plane, the P1 plane is vertical to a ground, a is a known angle between the P4 plane and the P1 plane, and c is a deviation angle then $$Lc = \arctan\frac{O_1P_1}{O_1P_2},$$

wherein $O_1P_1=OO_1-OP_1$, $OO_1=OP_2*\cos\alpha$, and $O_1P_2=OP_2 \sin\alpha$.

* * * * *